United States Patent Office 3,733,415
Patented May 15, 1973

3,733,415
ACARICIDAL COMPOSITIONS CONTAINING AN O-(2-ALKYL-4,6 - DINITRO-PHENYL)-O'-(α-CARBALKOXY-ALKYL)-CARBONATE
Heinz-Manfred Becher, Bingen (Rhine), and Richard Sehring, Ingelheim am Rhein, Germany, assignors to Boehringer Ingelheim G.m.b.H., Ingelheim am Rhein, Germany
No Drawing. Original application June 9, 1970, Ser. No. 45,274, now Patent No. 3,655,717. Divided and this application Nov. 12, 1971, Ser. No. 198,416
Int. Cl. A01n 9/20
U.S. Cl. 424—301        8 Claims

ABSTRACT OF THE DISCLOSURE

Acaricidal compositions containing as an active acaricidal ingredient a compound of the formula

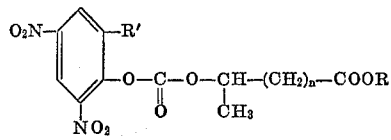

wherein

R is straight or branched alkyl of 1 to 12 carbon atoms,
R' is straight or branched alkyl of 1 to 8 carbon atoms or cyclohexyl, and
n is 0 to 1.

---

This is a division of copending application Ser. No. 45,274, filed June 9, 1970, now U.S. Pat. No. 3,655,717.

This invention relates to novel acaricidal compositions containing an O-(2-alkyl-4,6-dinitro-phenyl)-O'-(α-carbalkoxy-alkyl)-carbonate as an active ingredient, as well as to a method of killing acarids therewith.

More particularly, the present invention relates to acaricidal compositions containing as an active acaricidal ingredient a compound of the formula

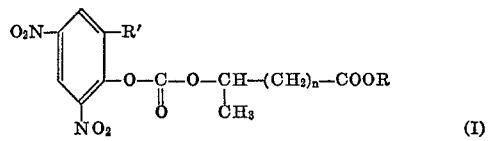

wherein

R is straight or branched alkyl of 1 to 12 carbon atoms,
R' is straight or branched alkyl of 1 to 8 carbon atoms or cyclohexyl, and
n is 0 or 1.

A compound of the Formula I is prepared by either of the following methods;

METHOD A

By reacting a 2-alkyl-4,6-dinitro-phenol compound of the formula

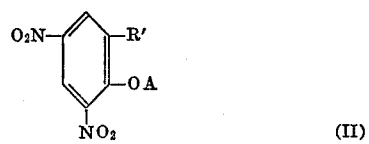

wherein

R' has the same meanings as in Formula I, and
A is hydrogen or an alkali metal, with phosgene to form a chlorocarbonate of the formula

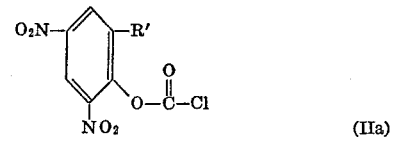

where R' has the same meanings as in Formula I and reacting the intermediate IIa with a hydroxy-alkanoic acid ester of the formula $$HO-CH-(CH_2)_n-COOR$$
$$\quad\ \ |$$
$$\quad\ \ CH_3 \qquad (III)$$

wherein R and n have the same meanings as in Formula I.

METHOD B

By reacting a hydroxy-alkanoic acid ester compound of the formula $$AO-CH-(CH_2)_n-COOR$$
$$\quad\ \ |$$
$$\quad\ \ CH_3 \qquad (IV)$$

wherein

R and n have the same meanings as in Formula I, and
A has the same meanings as in Formula II, with phosgene to form a chlorocarbonate of the formula

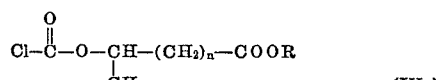

where R and n have the same meanings as in Formula I, and reacting the intermediate IVa with a 2-alkyl-4,6-dinitrophenol of the formula

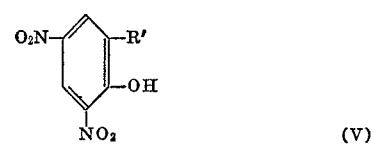

where R' has the same meanings as in Formula I.

In either of these methods, the reaction of the starting compound II or IV with phosgene, as well as the subsequent esterification of the intermediate IIa or IVa with the compound III or V, respectively, are preferably carried out in the presence of an inert organic solvent and in the presence of an acid-binding agent. Examples of suitable organic solvents are aromatic hydrocarbons, such as benezne, toluene or xylene, and ethers, such as tetrahydrofuran or dioxane. Examples of suitable acid-binding agents are alkali metal carbonates, alkali metal bicarbonates, alkali metal oxides, alkaline earth metal carbonates, alkaline earth metal bicarbonates, alkaline earth metal oxides, as well as organic bases, such as triethylamine, pyridine, N,N-dicyclohexyl-ethylamine and the like.

Also, in either of these methods, it is not necessary to isolate the intermediate chlorocarbonate IIa or IVa from the reaction mixture in which it is formed.

The starting compounds II and IV for methods A and B are known compounds.

The following examples further illustrate the preparation of compounds of the Formula I and will enable others skilled in the art to understand it more completely.

EXAMPLE 1

O-(2-sec.butyl-4,6-dinitro-phenyl)-O'-(1-ethoxycarbonylethyl-1)-carbonate by method B A solution of 10.0 gm. (0.0416 mol) of 2-sec.butyl-4,6-dinitro-phenol, 8.8 gm. (0.049 mol) of O-chloroformyl ethyl lactate (prepared by reacting ethyl lactate with phosgene) and 3.5 gm. (0.044 mol) of pyridine in 100 ml. of benzene was stirred at room temperature for several hours. Thereafter, the pyridine hydrochloride which had crystallized out was separated by vacuum filtration. The filtrate was extracted several times with anhydrous potassium carbonate to remove unreacted 2-sec. butyl-4,6-dinitro-phenol, and the extracts were discarded. The benzene was then distilled out of the extracted filtrate, initially at atmospheric pressure and toward the end in vacuo, leaving 14.9 gm. (93% of theory) of a yellowish oil, which was identified to be O-(2-sec.butyl-4,6-dinitrophenyl)-O'-(1-ethoxycarbonyl-ethyl-1)-carbonate of the formula

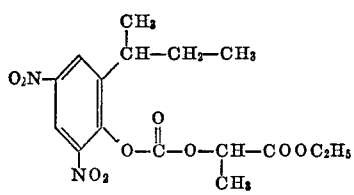

The product was thin-layer chromatographically uniform.

Elemental Analysis.—Calculated (percent): C, 50.00; H, 5.24; N, 7.29. Found (percent): C, 49.81; H, 5.02; N, 7.36.

EXAMPLE 2

Using a procedure analogous to that described in Example 1, O - (2 - sec.butyl-4,6-dinitro-phenyl)-O'-[1-ethoxy-carbonyl - n - propyl-(2)]-carbonate, a yellowish non-crystallizable oil, of the formula

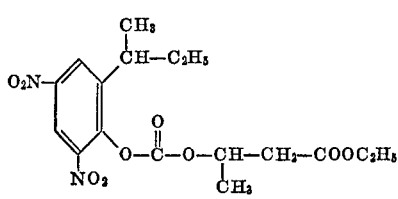

was prepared from O-chloroformyl ethyl-β-hydroxy-butyrate and 2-sec.butyl-4,6-dinitro-phenol.

Elemental analysis.—Calculated (percent): C, 51.3; H, 5.56; N, 7.04. Found (percent): C, 51.2; H, 5.47; N, 7.01.

EXAMPLE 3

Using a procedure analogous to that described in Example 1, O-(2 - sec.butyl - 4,6 - dinitro-phenyl)-O'-[1-methoxy-carbonyl-ethyl]-carbonate, a yellowish non-crystallizable oil, of the formula

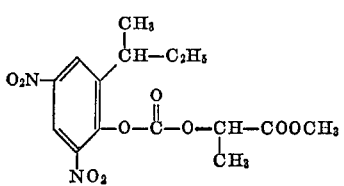

was prepared from O-chloroformyl methyl lactate and 2-sec. butyl-4,6-dinitro-phenol.

Elemental analysis.—Calculated (percent): C, 48.6; H, 4.89; N, 7.57. Found (percent): C, 48.5; H, 4.77; N, 7.51.

EXAMPLE 4

Using a procedure analogous to that described in Example 1, O-(2 - sec.butyl - 4,6 - dinitro-phenyl)-O'-[1-iso-propoxycarbonyl-ethyl]-carbonate, a yellowish non-crystallizable oil, of the formula

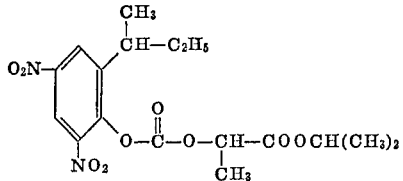

was prepared from O-chloroformyl isopropyl lactate and 2-sec.butyl-4,6-dinitro-phenol.

Elemental analysis.—Calculated (percent): 51.3; H, 5.56; N, 7.04. Found (percent): C, 51.0; H, 5.32; N, 6.89.

EXAMPLE 5

Using a procedure analogous to that described in Example 1, O-(2-sec.butyl - 4,6 - dinitro-phenyl)-O'-[1-n-butoxycarbonyl-ethyl]-carbonate, a yellowish non-crystallizable oil, of the formula

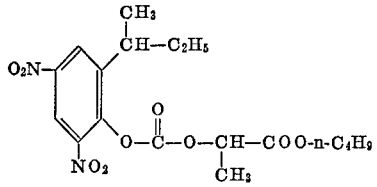

was prepared from O-chloroformyl n-butyl lactate and 2-sec.butyl-4,6-dinitro-phenol.

Elemental analysis.—Calculated (percent): C, 52.5; H, 5.86; N, 6.80. Found (percent): C, 52.6; H, 5.89; N, 6.95.

EXAMPLE 6

Using a procedure analogous to that described in Example 1, O-(2-sec.butyl - 4,6 - dinitro-phenyl)-O'-[1-n-amyloxycarbonyl-ethyl]-carbonate, a yellowish non-crystallizable oil, of the formula

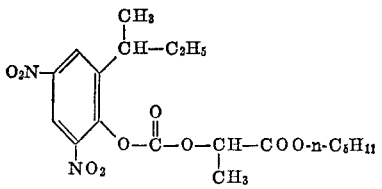

was prepared from O-chloroformyl n-amyl lactate and 2-sec.butyl-4,6-dinitro-phenol.

Elemental Analysis.—Calculated (percent): C, 53.6; H, 6.11; N, 6.58. Found (percent): C, 53.3; H, 5.93; N, 6.71.

EXAMPLE 7

Using a procedure analogous to that described in Example 1, O-(2-sec.butyl - 4,6 - dinitro-phenyl)-O'-[1-isoamyl-oxycarbonyl-ethyl]-carbonate, a yellowish non-crystallizable oil, of the formula

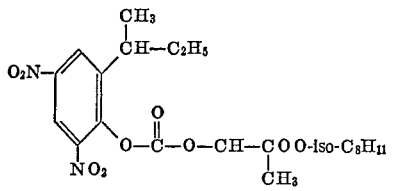

was prepared from O-chloroformyl isoamyl lactate and 2-sec.butyl-4,6-dinitro-phenol.

Elemental analysis.—Calculated (percent): C, 53.6; H, 6.11; N, 6.58. Found (percent): C, 53.4; H, 5.90; N, 6.75.

EXAMPLE 8

Using a procedure analogous to that described in Example 1, O-(2-sec.butyl - 4,6 - dinitro-phenyl)-O'-[1-n-octyl-oxycarbonyl-ethyl]-carbonate, a yellowish non-crystallizable oil, of the formula

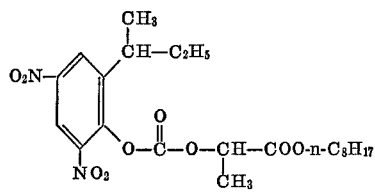

was prepared from O-chloroformyl n-octyl lactate and 2-sec.butyl-4,6-dinitro-phenol.

*Elemental analysis.*—Calculated (percent): C, 56.5; H, 6.90; N, 5.98. Found (percent): C, 56.2; H, 6.78; N, 6.06.

EXAMPLE 9

Using a procedure analogous to that described in Example 1, O-(2-sec.butyl - 4,6 - dinitro-phenyl)-O'-[1-methoxy-carbonyl-n-propyl - (2)] - carbonate, a yellowish non-crystallizable oil, of the formula

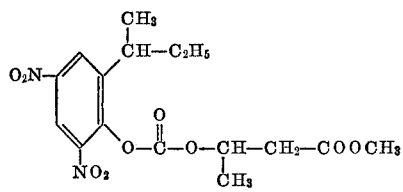

was prepared from 9.0 gm. of O-chloroformyl methyl β-hydroxybutyrate and 10.0 gm. of 2-sec.butyl-4,6-dinitrophenol in the presence of 3.5 gm. of pyridine and 100 ml. of tetrahydrofuran. The yield was in excess of 80% of theory.

EXAMPLE 10

Using a procedure analogous to that described in Example 1, O-(2-sec.butyl - 4,6 - dinitro-phenyl)-O'-[1-isoamyl-oxycarbonyl-n-propyl - (2)] - carbonate, a yellowish non-crystallizable oil, of the formula

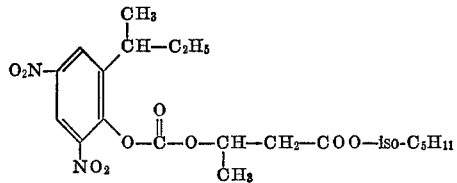

was prepared from 17.5 gm. of O-chloroformyl isoamyl β-hydroxy-butyrate and 15.0 gm. of 2-sec.butyl-4,6-dinitro-phenol in the presence of 5.2 gm. of pyridine and 200 ml. of dioxane.

EXAMPLE 11

Using a procedure analogous to that described in Example 1, O-(2-sec.butyl - 4,6 - dinitro-phenyl)-O'-[1-n-dodecyl-oxycarbonyl-n-propyl - (2)] - carbonate, a yellowish non-crystallizable oil, of the formula

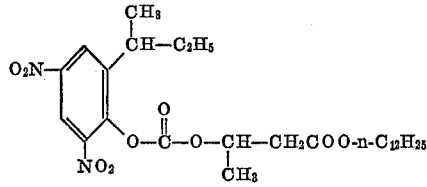

was prepared from O-chloroformyl n-dodecyl β-hydroxy-butyrate and 2-sec.butyl-4,6-dinitro-phenol.

EXAMPLE 12

O-(2-sec.butyl-4,6-dinitro-phenyl)-O'-(1-ethoxy-carbonyl-ethyl)-carbonate 24.0 gm. (0.10 mol) of 2-sec.butyl-4,6-dinitro-phenol were dissolved in 100 ml. of acetone, and then 5.56 gm. (0.0525 mol) of anhydrous sodium carbonate were added to the solution. The resulting mixture was boiled until the sodium carbonate had almost completely gone into solution (for about 30 minutes), and then the still undissolved sodium carbonate was filtered off and the filter cake was washed with acetone. 19.0 gm. (0.105 mol) of O-chloroformyl ethyl lactate were added to the filtrate, and the resulting solution was refluxed for two hours. Thereafter, the sodium chloride which had separated out was isolated from the solution by centrifuging and vacuum-filtration and washed with acetone. The wash liquid was combined with the filtrate, and the solution was evaporated until an oily residue was left. Finally, the oily residue was heated for 20 minutes at about 100° C. in a high vacuum to remove all residual volatile impurities. 37.7 gm. (98% of theory) of O-(2-sec.butyl-4,6-dinitro-phenyl)-O'-(1-ethoxycarbonyl-ethyl)-carbonate were obtained.

EXAMPLE 13

O-(2-sec.amyl-4,6-dinitro-phenyl)-O'-(1-ethoxy-carbonyl-ethyl)-carbonate

A solution of 12.7 gm. (0.050 mol) of 2-sec-amyl-4,6-dinitro-phenol, 10.8 gm. (0.060 mol) of O-chloroformyl ethyl lactate and 4.7 gm. (0.059 mol) of pyridine in 100 ml. of benzene was stirred for several hours at room temperature. Thereatfer, the pyridine hydrochloride which had crystallized out was separated by vacuum-filtration, and the filtrate was extracted several times with anhydrous potassium carbonate to remove unreacted 2-sec.amyl-4,6-dinitro-phenol. The filtrate was then diluted, initially at atmospheric pressure and toward the end in vacuo, to remove the benzene, leaving 19.1 gm. (96% of theory) of an oily residue which was identified to be O-(2-sec.amyl-4,6-dinitro-phenyl)-O - (1-ethoxycarbonyl-ethyl)carbonate of the formula

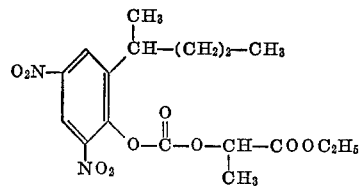

The product was thin-layer chromatographically uniform.
*Elemental analysis.*—Calculated (percent): C, 51.3; H, 5.56; N, 7.04. Found (percent): C, 51.1; H, 5.77; N, 6.86.

EXAMPLE 14

Using a procedure analogous to that described in Example 13, O-(2-methyl-4,6-dinitro-phenyl)-O'-[1-ethoxycarbonyl-ethyl]-carbonate, an oil, of the formula

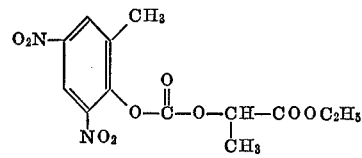

was prepared from O-chloroformyl ethyl lactate and 2-methyl-4,6-dinitro-phenol.

*Elemental analysis.*—Calculated (percent): C, 45.60; H, 4.12; N, 8.18. Found (percent): C, 45.42; H, 4.25; N, 8.06.

EXAMPLE 15

Using a procedure analogous to that described in Example 13, O-(2-methyl - 4,6 - dinitro-phenyl)-O'-[1-n-butoxycarbonyl-ethyl]-carbonate, an oil, of the formula

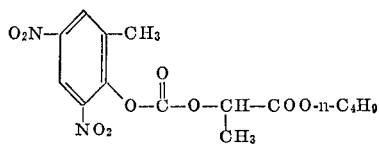

was prepared from O-chloroformyl n-butyl lactate and 2-methyl-4,6-dinitro-phenol.

*Elemental analysis.*—Calculated (percent): C, 48.6; H, 4.90; N, 7.57. Found (percent): C, 48.54; H, 4.99; N, 7.51.

EXAMPLE 16

Using a procedure analogous to that described in Example 13, O-(2-isopropyl-4,6-dinitro-phenyl)-O'-[1-ethoxycarbonyl-ether]-carbonate, an oil, of the formula

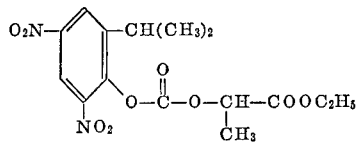

was prepared from O-chloroformyl ethyl lactate and 2-isopropyl-4,6-dinitro-phenol.

*Elemental analysis.*—Calculated (percent): C, 48.60; H, 4.90; N, 7.57. Found (percent): C, 48.52; H, 4.84, N, 7.47.

EXAMPLE 17

Using a procedure analogous to that described in Example 13, O-(2-n-butyl-4,6-dinitro-phenyl)-O'-[1-ethoxycarbonyl-ethyl]-carbonate, an oil, of the formula

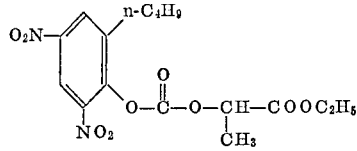

was prepared from O-chloroformyl ethyl lactate and 2-n-butyl-4,6-dinitro-phenol.

*Elemental analysis.*—Calculated (percent): C, 50.00; H, 5.24; N, 7.29. Found (percent): C, 49.79; H, 5.32; N, 7.18.

EXAMPLE 18

Using a procedure analogous to that described in Example 13, O - (2 - sec.amyl-4,6-dinitro-phenyl)-O'-[1-methoxycarbonyl-ethyl]-carbonate, an oil, was prepared from O-chloroformyl methyl lactate and 2-sec.amyl-4,6-dinitro-phenol.

*Elemental analysis.*—Calculated (percent): C, 50.00; H, 5.24; N, 7.29. Found (percent): C, 49.75; H, 5.33; N, 7.01.

EXAMPLE 19

Using a procedure analogous to that described in Example 13, O - (2 - sec.amyl-4,6-dinitro-phenyl)-O'-[1-ethoxycarbonyl-ethyl] - carbonate, an oil, was prepared from O-chloroformyl ethyl lactate and 2-sec.amyl-4,6-dinitro-phenol.

*Elemental analysis.*—Calculated (percent): C, 51.30; H, 5.56; N, 7.04. Found (percent): C, 51.10; H, 5.77; N, 6.86.

EXAMPLE 20

Using a procedure analogous to that described in Example 13, O - (2-sec.amyl-4,6-dinitro-phenyl)-O'-[1-n-butoxycarbonyl - ethyl]-carbonate, an oil, was prepared from O-chloroformyl n-butyl lactate and 2-sec.amyl-4,6-dinitro-phenol.

*Elemental analysis.*—Calculated (percent): C, 53.60; H, 6.15; N, 6.58. Found (percent): C, 53.33; H, 6.20; N, 6.39.

EXAMPLE 21

Using a procedure analogous to that described in Example 13, O - (2-sec.amyl-4,6-dinitro-phenyl)-O'-[1-n-octyloxycarbonyl-ethyl]-carbonate, and oil, was prepared from O-chloroformyl n-octyl lactate and 2-sec.amyl-4,6-dinitrophenol.

*Elemental analysis.*—Calculated (percent): C, 57.40; H, 7.11; N, 5.81. Found (percent): C, 57.06; H, 7.24; N, 5.60.

EXAMPLE 22

Using a procedure analogous to that described in Example 13, O - (2-sec.amyl-4,6-dinitro-phenyl)-O'-[1-ethoxycarbonyl-n-propyl-(2)]-carbonate, an oil, was prepared from O-chloroformyl ethyl β-hydroxy-butyrate 2-sec.amyl-4,6-dinitro-phenol.

*Elemental analysis.*—Calculated (percent): C, 52.50; H, 5.85; N, 6.80. Found (percent): C, 52.21; H, 5.98; N, 6.52.

EXAMPLE 23

Using a procedure analogous to that described in Example 13, O - (2-sec.octyl-4,6-dinitro-phenyl)-O'-[1-ethoxycarbonyl-ethyl]-carbonate, a yellowish non-crystallizable oil, of the formula

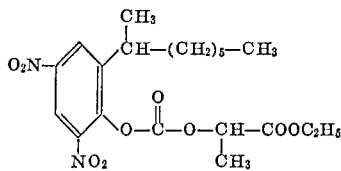

was prepared from O-chloroformyl ethyl lactate and 2-sec.octyl-4,6-dinitro-phenol.

*Elemental analysis.*—Calculated (percent): C, 54.50; H, 6.41; N, 6.37. Found (percent): C, 54.27; H, 6.43; N, 6.28.

EXAMPLE 24

Using a procedure analogous to that described in Example 13, O-(2-cyclohexyl-4,6-dinitro-phenyl)-O'-[1-ethoxycarbonyl-ethyl]-carbonate, an oil, of the formula

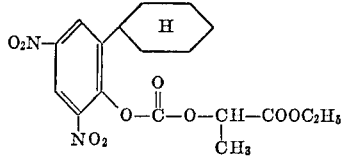

was prepared from O-chloroformyl ethyl lactate and 2-cyclohexyl-4,6-dinitro-phenol.

*Elemental analysis.*— Calculated (percent): C, 52.70; H, 5.40; N, 6.84. Found (percent): C, 52.44; H, 5.49; N, 6.57.

The compounds embraced by Formula I above have useful properties. More particularly, they all exhibit very effective acaricidal activities, especially against red spider mites, while being non-toxic toward plants; a few of them also exhibit fungicidal, insecticidal and ovicidal activities.

For acaricidal purposes the compounds of the Formula I are applied as active ingredients in conventional liquid or solid pesticidal compositions, such as dusting powders, suspensions, emulsions, solutions, aerosols and the like. Such compositions may additionally comprise customary inert auxiliary ingredients, such as emulsifiers, diluents and adhesion-enhancing agents, as well as additional pesticidal agents. The effective acaricidal concentration range of the compounds of the Formula I in such compositions is from 0.001 to 5% by weight, based on the total weight of the composition.

The following examples illustrate a few acaricidal compositions comprising a compound of the Formula I as an active ingredient and represent the best modes contemplated of putting the invention into practical use.

The parts are parts by weight unless otherwise specified.

EXAMPLE 25

Emulsion concentrate 20 parts of O-(2-sec.butyl-4,6-dinitro-phenyl) - O' - (1-ethoxycarbonyl-ethyl)-carbonate and 10 parts of butyl ricinoleate sulfonate were dissolved in 70 parts of a commercial mixture of aromatic hydrocarbons. The resulting concentrate was then emulsified in the required amount of water to make the concentration of the mixed carbonate in the aqueous emulsion about 0.02%. The emulsion was then sprayed at the rate of 2,000 liters/hectare on an apple orchard infested with red spider mites. A 100% kill of the spider mites was achieved without injury to the apple trees.

EXAMPLE 26

Wettable powder 20 parts of O-(2-sec.butyl-4,6-dinitro-phenyl)-O'-[1-methoxycarbonyl-n-propyl - (2)] - carbonate, 20 parts of kaolin, 5 parts of sodium sulfate, 2 parts of finely divided calcium carbonate, 8 parts of calcium lignin sulfonate, 2 parts of alkyl naphthalene sulfonate and 43 parts of siliceous chalk were intimately admixed with each other, and the mixture was milled. The resulting powder was suspended in a sufficient amount of water to make the concentration of the mixed carbonate in the aqueous suspension about 0.04%. The suspension was then sprayed at the rate of 2,000 liters/hectare on an apple orchard infested with red spider mites. A 100% kill of the spider mites was obtained without injury to the apple trees.

EXAMPLE 27

Dusting power 2 parts of O-(2-sec.butyl-4,6-dinitro-phenyl) - O' - [1-ethoxycarbonyl-ethyl]-carbonate were intimately admixed with 98 parts of kaolin, and the mixture was milled. The resulting powder was dusted at the rate of 30 kg./hectare on a bean field infested with red spider mites. A 100% kill of the spider mites was obtained without injury to the bean plants.

EXAMPLE 28

Wettable powder

A mixture of 25 parts of O-(2-sec.amyl-4,6-dinitro-phenyl)-O'-[1-ethoxycarbonyl - ethyl] - carbonate and 25 parts of diatomaceous earth was thoroughly milled with 2 parts of prepared chalk (calcium carbonate), 5 parts of anhydrous sodium sulfate, 33 parts of siliceous chalk, 9 parts of a stabilizer (Collex 4/5) and 1 part of a sodium alkylnaphthalenesulfonate wetting agent (Nekal BX-78, GAF Corp.). The resulting powder was suspended in a sufficient amount of water to make the concentration of the mixed carbonate in the aqueous suspension about 0.03%. The aqueous suspension was sprayed at the rate of 2,000 liters/hectare on an apple orchard infested with red spider mites. A 100% kill of the spider mites was obtained without injury to the apple trees.

EXAMPLE 29

Dusting powder

A mixture of 2- parts of O-(2-sec.amyl-4,6-dinitro-phenyl) - O' - [1-ethoxycarbonyl-ethyl]-carbonate and 2 parts of diatomaceous earth was thoroughly admixed with 96 parts of kaolin, and the mixture was milled. The resulting powder was dusted at the rate of 20 kg./hectare on a bean field infested with red spider mites. A 100% kill of the spider mites was obtained without injury to the bean plants.

Analogous results were obtained when an equal amount of any one of the other compounds embraced by Formula I was substituted for the particular mixed carbonate in Examples 25 through 29. Likewise, the concentration of the active acaricidal ingredient in these examples may be varied, as may the amounts and nature of the inert ingredients, to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. An acaricidal composition consisting essentially of an inert solid or liquid carrier and an effective acaricidal amount of a compound of the formula

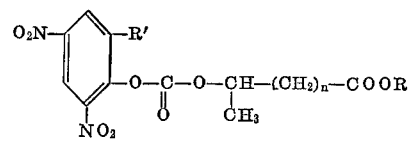

wherein

R is straight or branched alkyl of 1 to 12 carbon atoms,
R' is straight or branched alkyl of 1 to 8 carbon atoms or cyclohexyl, and
$n$ is 0 or 1.

2. The composition of claim 1, wherein said compound is O-(2-sec.butyl-4,6-dinitro-phenyl)-O'-[1-ethoxycarbonyl-ethyl]-carbonate.

3. The composition of claim 1, wherein said compound is O-(2-sec.butyl-4,6-dinitro-phenyl)-O'-[1-methoxy-carbonyl-n-propyl-(2)]-carbonate.

4. The composition of claim 1, wherein said compound is O-(2-sec.amyl-4,6-dinitro-phenyl)-O'-[1-ethoxycarbonyl-ethyl]-carbonate.

5. The method of killing acarids, which comprises contacting said acarids with an effective acaricidal amount of a compound of the formula

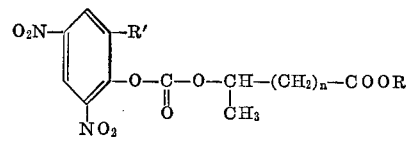

wherein

R is straight or branched alkyl of 1 to 12 carbon atoms,
R' is straight or branched alkyl of 1 to 8 carbon atoms or cyclohexyl, and
$n$ is 0 or 1.

6. The method of claim 5, wherein said compound is O (2-sec.butyl - 4,6 - dinitro-phenyl)-O'-[1-ethoxycarbonyl-ethyl]-carbonate.

7. The method of claim 5, wherein said compound is O-(2-sec.butyl - 4,6 - dinitro-phenyl)-O'-[1-methoxycarbonyl-n-propyl-(2)]-carbonate.

8. The method of claim 5, wherein said compound is O-(2 - sec.amyl-4,6-dinitro-phenyl)-O'-[1-ethoxycarbonyl-ethyl]-carbonate.

References Cited

UNITED STATES PATENTS

| | | | |
|---|---|---|---|
| 3,234,260 | 2/1966 | Planka et al. | 260—463 |
| 3,419,620 | 12/1968 | Becker et al. | 260—611 |

FOREIGN PATENTS 1,550,196  12/1968  France.

ALBERT T. MEYERS, Primary Examiner

L. SCHENKMAN, Assistant Examiner

UNITED STATES PATENT OFFICE
CERTIFICATE OF CORRECTION

Patent No. 3,733,415      Dated May 15, 1973

Inventor(s) Heinz-Manfred Becher et al.

It is certified that error appears in the above-identified patent and that said Letters Patent are hereby corrected as shown below:

Column 1, line 12 - insert

-- Claims priority, applications Germany,

June 16, 1969, P 19 30 593.2

December 5, 1969, P 19 61 210.3 --

Column 4, line 68, the formula should read as shown below:

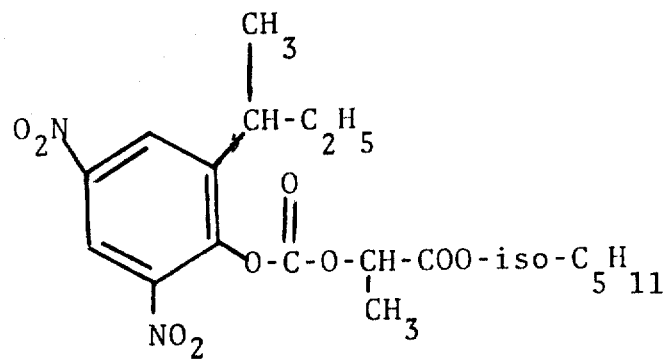

Signed and sealed this 20th day of August 1974.

(SEAL)
Attest:

McCOY M. GIBSON, JR.
Attesting Officer

C. MARSHALL DANN
Commissioner of Patents